United States Patent
Jones

(10) Patent No.: US 9,989,189 B1
(45) Date of Patent: Jun. 5, 2018

(54) STRAPS FOR PIPE INSULATION

(71) Applicant: Jerry D. Jones, Canonsburg, PA (US)

(72) Inventor: Jerry D. Jones, Canonsburg, PA (US)

( * ) Notice: Subject to any disclaimer, the term of this patent is extended or adjusted under 35 U.S.C. 154(b) by 0 days. days.

(21) Appl. No.: 15/431,211

(22) Filed: Feb. 13, 2017

(51) Int. Cl.
*F16L 9/14* (2006.01)
*F16L 59/02* (2006.01)
*F16B 2/08* (2006.01)
*F16L 59/14* (2006.01)

(52) U.S. Cl.
CPC ............. *F16L 59/022* (2013.01); *F16B 2/08* (2013.01); *F16L 59/026* (2013.01); *F16L 59/14* (2013.01)

(58) Field of Classification Search
CPC ....... F16L 59/022; F16L 59/023; F16L 59/14; F16B 2/08; Y10T 24/1459
USPC ........... 138/149, 156, 128, 166–168; 24/271, 24/272
See application file for complete search history.

(56) References Cited

U.S. PATENT DOCUMENTS

| | | | | |
|---|---|---|---|---|
| 1,735,932 A * | 11/1929 | Nelson | ................ | F16L 33/12 24/271 |
| 1,819,553 A | 8/1931 | Gysling | | |
| 1,847,475 A * | 3/1932 | Donald | ................ | F16L 33/12 24/271 |
| 1,860,203 A * | 5/1932 | Rishel | ................ | F16L 59/022 138/141 |
| 2,869,211 A * | 1/1959 | Kessler | ................ | F16L 23/06 24/270 |
| 4,073,317 A * | 2/1978 | Ellis | ................ | F16L 3/137 138/147 |
| 4,207,918 A | 7/1980 | Burns et al. | | |
| 4,564,981 A | 1/1986 | Knox | | |
| 4,660,870 A * | 4/1987 | Donley | ................ | F16L 33/12 24/273 |
| 4,854,015 A | 8/1989 | Shaull | | |
| 5,112,661 A * | 5/1992 | Pendergraft | ............ | B29C 45/74 138/149 |
| 5,714,738 A * | 2/1998 | Hauschulz | ............ | F16L 53/005 138/33 |
| 5,934,337 A * | 8/1999 | Fiala | ................ | F16L 59/023 138/149 |
| 6,460,576 B2 * | 10/2002 | Vitoorapakorn | ...... | F16L 3/1233 138/149 |
| 7,762,283 B2 * | 7/2010 | Sasaki | ................ | F16L 59/021 138/149 |

(Continued)

OTHER PUBLICATIONS

Pipe Insulation Closure Clips. Product Listing [online]. AM Conservation Group Inc., 2016. [retrieved online Apr. 13, 2016]. Retrieved from the Internet: http://www.amconservationgroup.com/products/weatherization-products/closure-clips/?variation_id=3513.

(Continued)

*Primary Examiner* — Patrick F Brinson
(74) *Attorney, Agent, or Firm* — Aaron R. Cramer; Cramer Patent & Design, PLLC

(57) ABSTRACT

A piping strapping and insulation system provides a pair of strap assemblies which act to close a seam portion of an insulation structure around a correspondingly-shaped existing piping member such as a pipe, a valve, a pressure vessel, or the like. The straps are removably attached the insulation structure to allow disassembly and reuse of the strapping. It is envisioned that the piping insulation structures would be available in various sizes and shapes which correspond to differently shaped existing piping members.

18 Claims, 3 Drawing Sheets

(56) References Cited

U.S. PATENT DOCUMENTS 7,947,354 B2    5/2011  Pirogovsky et al.
9,068,582 B2 *  6/2015  Wolbert .................... F16B 2/08

OTHER PUBLICATIONS

The Powerblanket Heated Pipe Wrap. Product Listing [online]. Thermal Equipment Sales Co. Inc., 2005. [retrieved online Apr. 13, 2016]. Retrieved from the Internet: http://www.thermalinc.com/electheaters/Powerblanket_pipe.htm.

* cited by examiner

STRAPS FOR PIPE INSULATION

RELATED APPLICATIONS

None.

FIELD OF THE INVENTION

The present invention relates generally to the field of a securing mechanism for installing insulation on pipework.

BACKGROUND OF THE INVENTION

With the recent hike in energy costs, many are reexamining their energy usage in an effort to save on rising costs. For many homes or businesses, the heating and cooling bill is one (1) of the largest components of the budget. One (1) way to combat such elevated heating bills is to warm or insulate piping, valves, or other equipment within the home or building structure. Temperatures low enough to cause freezing can wreak havoc on almost any device, especially those such as gutters and pipes.

One (1) known method for insulating such piping, valves, or other equipment is wrapping the desired equipment with an electrical heat trace tape. Electric heat tracing is commonly used to prevent freezing, maintain process temperatures, and protect products. However, electric heat tracing requires a source of electrical power in order to operate. While this is not a problem in certain home and industrial settings, the use of such devices in remote locations is very difficult to accomplish. This requires the routing of an electrical line to the location along with associated electrical power usage, which is difficult and either exposes unsightly and dangerous wires or requires specialized construction of an available electric source at additional cost and inconvenience.

Other, more common and less restrictive or expensive methods include the use of insulated blankets, which need to be manually installed and removed as necessary. Such blankets are desirable because they can be customized to fit the piping or equipment necessary, easily removed, and cost effective. It has been identified that these blankets need to be easy to install and remove in order to provide the operators or personnel the opportunity to provide maintenance at the job sites. Typical blankets include the use of lacing anchors and wire lacing which is hard to reinstall and has many safety hazards. Therefore, a need to have a blanket that provides proper insulation to the piping or piece of equipment that is easy, quick, and safe to install and remove is desirable.

SUMMARY OF THE INVENTION

In order to achieve the object of providing such an insulation system for a portion of a piping element and securing the system, the invention describes an insulation structure, at least one (1) pair of strap assemblies, each having a tightening strap assembly and an anchoring strap assembly each removably attached at a first end to the insulation structure, a ring conjoining second ends of the tightening strap assembly and anchoring strap assembly, and an attachment means for removably attaching the first ends of the tightening strap assembly and anchoring strap assembly to the insulation structure.

Another object of the invention is to provide such an insulation structure having a first end, a second end, a first side, a second side, and a plurality of layers, including an outer layer, an inner layer, and an insulation disposed therebetween. In a preferred embodiment, the inner layer and outer layer each comprise a heat-resistant polymer sheet material. In certain embodiments, the insulation layer is disposed between or bonded to the outer and inner layers. The insulation structure is capable of either being formed as a cylinder or planar and wrapped around a cylindrical piping element such that the first end and second ends approach each other to form a seam. Each pair of strap assemblies join together to close the seam when adjusted.

Another object of each pair of strap assemblies includes the tightening strap assembly, having a first tightening loop attached to the first side of the first end, adjacent the seam, via the attachment means. Similarly, the anchoring strap assembly has a first anchoring loop attached to the first side of the second end, adjacent the seam, via the attachment means. A ring conjoins a second tightening loop to a second anchoring loop. The tightening strap assembly further has a free end that can be removably attached to the first tightening loop.

Yet another object of the invention is to provide such an attachment means that includes a rod having a head attached to a respective first tightening loop or first anchoring loop and retained therein and against the outer layer with a first retaining washer, routed through each layer of the insulation structure, and a piercing end that, when bent, is retained against the inner layer.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
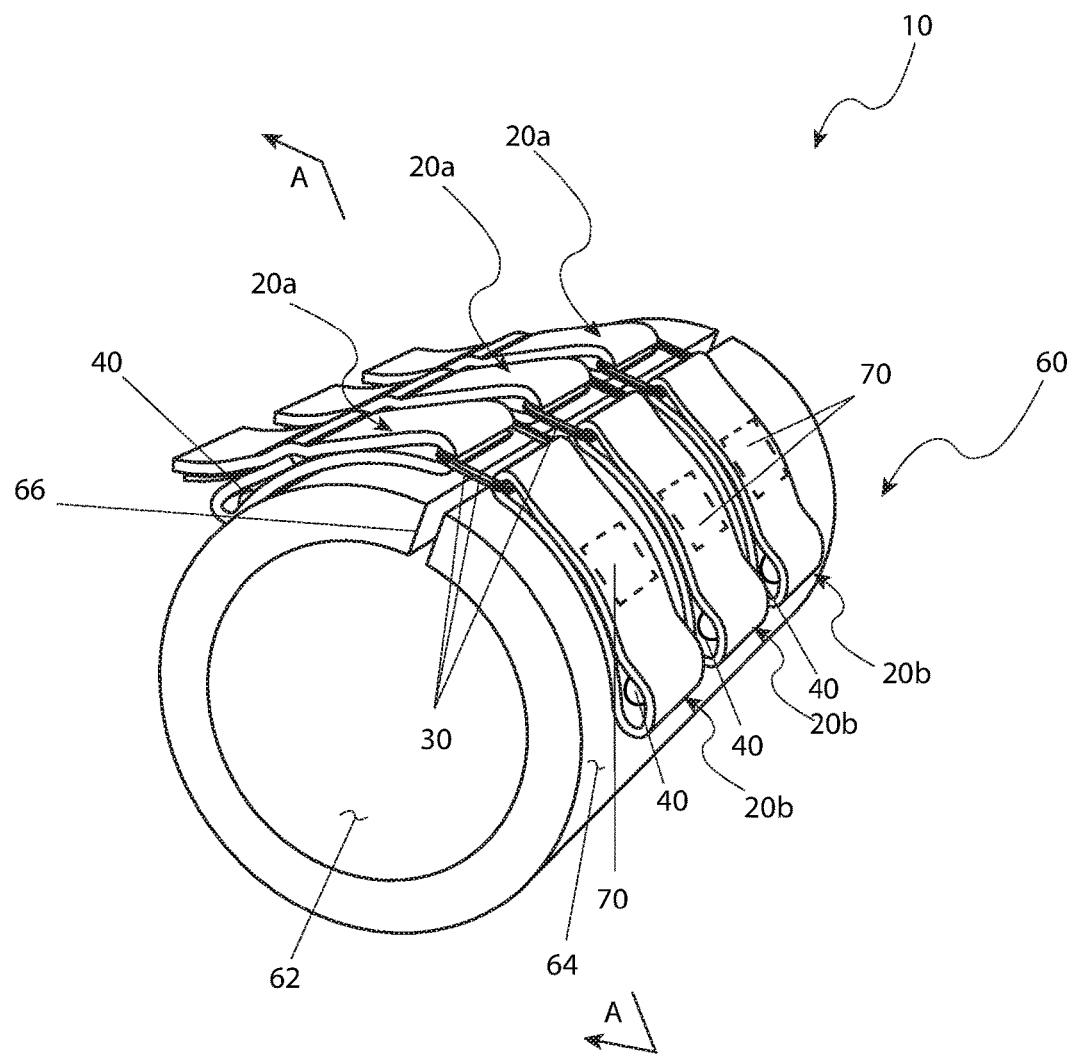
FIG. 1 is a perspective view of a strapping and insulation system for piping 10, according to a preferred embodiment of the present invention.

DESCRIPTIVE KEY 10 strapping and insulation system
20a tightening strap assembly
20b anchoring strap assembly
22a first strap section
22b second strap section
24a first strap loop
24b second strap loop
24c third strap loop
24d fourth strap loop
30 ring
40 rod
41 rod shank
42 rod head
43 rod tip
44a first retaining washer
44b second retaining washer
45 bend
60 insulation structure 62 inner layer
64 outer layer
66 seam
68 insulation layer
80a first closure
80b second closure
70 sewn region
100 existing piping member

DETAILED DESCRIPTION OF THE
PREFERRED EMBODIMENT

Figure 2:
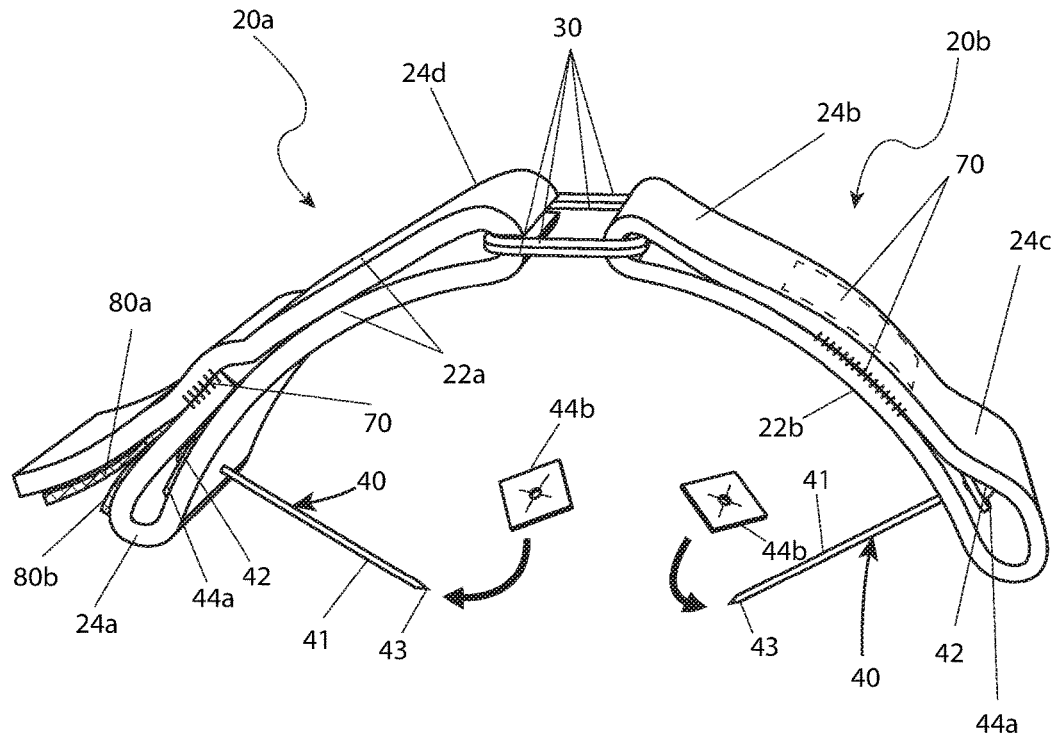
FIG. 2 is an isolated perspective view of strap assembly portions 20a, 20b of the strapping and insulation system 10, according to a preferred embodiment of the present invention; and, FIG. 3 is a sectional view of the strapping and insulation system 10 taken along section line A-A (see FIG. 1), according to a preferred embodiment of the present invention.
Figure 3:
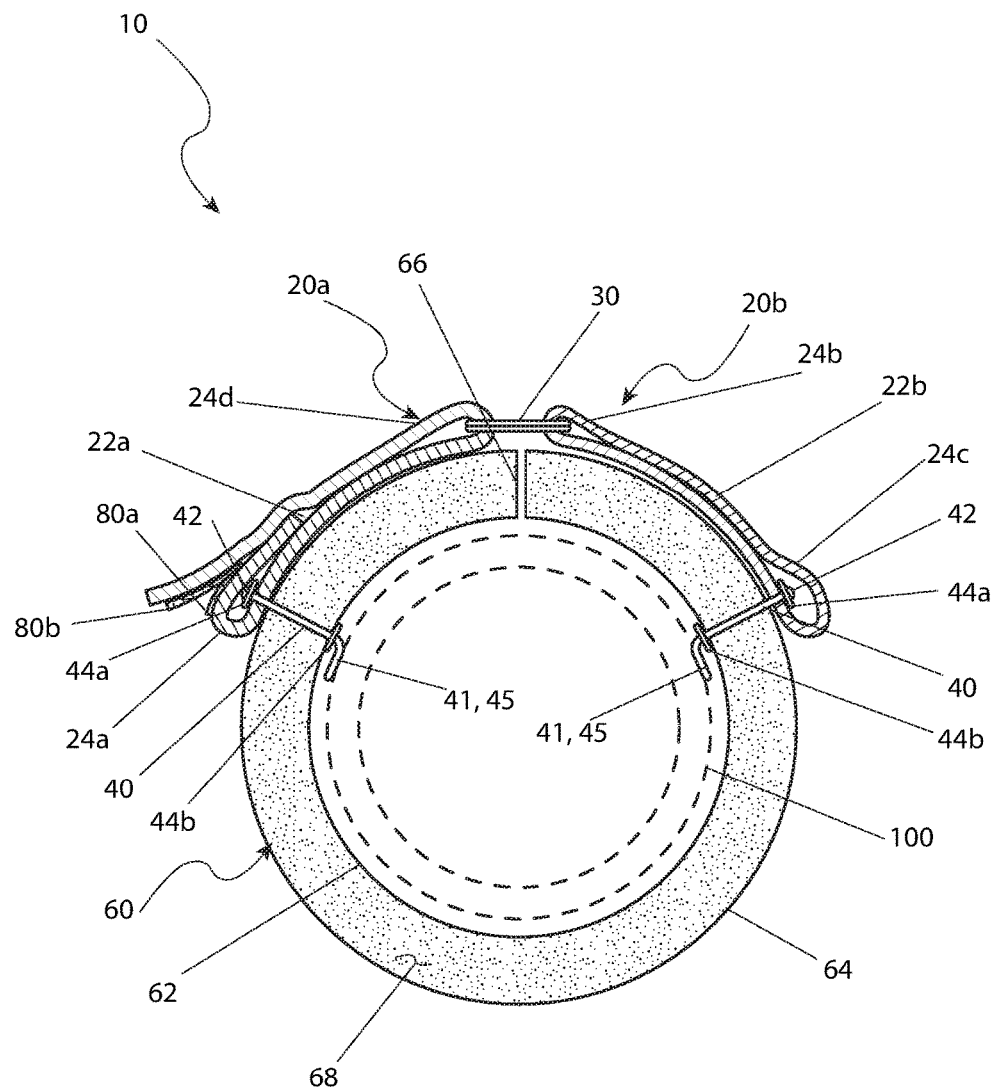

The best mode for carrying out the invention is presented in terms of its preferred embodiment, herein depicted within FIG. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a strapping and insulation system for piping (herein described as the "system") 10, which provides a pair of strap assemblies 20a, 20b and an insulation structure 60. The strap assemblies 20a, 20b act to close a seam portion 66 of the insulation structure 60a, thereby securing the insulation structure 60 around a correspondingly-shaped portion of an outer surface of an existing piping member 100 such as a pipe, a valve, a pressure vessel, or the like. It is envisioned that the piping insulation structures 60 would be available in various sizes and shapes which correspond to differently shaped existing piping members 100.

Referring now to FIG. 1, a perspective view of the system 10, according to the preferred embodiment of the present invention, is disclosed. A particular embodiment of the insulation structure 60 is illustrated here being sized and shaped to surround and insulate a length of pipe. In this embodiment, the insulation structure 60 provides a hollow cylindrical shape having an inner layer 62, an outer layer 64, and an insulation layer 68 (see FIG. 3). The inner 62 and outer 64 layers are envisioned to be made using a heat-resistant polymer sheet material such as polyvinyl chloride (vinyl), HDPE (high-density polyethylene), phenol-formaldehyde resin, meta-aramid polymer (Nomex), or the like. The inner 62 and outer 64 layers are envisioned to be bonded to the insulation layer 68 which is envisioned to be made using materials such as mineral wool batting, rock wool, polystyrene beads, urethane foam, vermiculite, Perlite, or the like.

The embodiment of the system 10 shown here utilizes a plurality of tightening strap assemblies 20a, and corresponding anchoring strap assemblies 20b, along a seam portion 66 of the insulation structure 60. The strap assemblies 20a, 20b provide a length-adjusting means and are joined together by at least one (1) ring 30. The strap assemblies 20a, 20b are secured to outer surface portions of the insulation structure 60 upon opposing sides of the seam 66, thereby acting to join and pull together the seam 66. It is envisioned that multiple strap assembly 20a, 20b combinations would be arranged along the seam 66 in a parallel manner, an actual number of which would be based upon particularly shaped and sized insulation structures 60. The strap assemblies 20a, 20b are removably attached to the insulation structure 60 via piercing pin portions 40 which allow the strap assemblies 20a, 20b to be removed from the insulation structure 60 and reused multiple times, if desired.

The embodiment of the system 10 shown here utilizes pairs of rings 30 arranged in tandem, having a generally rectangular shape and having round cross-sectional shapes; however, it is understood that the rings 30 may utilize various shapes such as, but not limited to: round, oval, elliptical, and the like, as well as different sizes and materials with equal benefit, and as such should not be interpreted as a limiting factor of the system 10. Furthermore, it is understood that the rings 30 may provide various sectional dimensions required to obtain a needed mechanical strength for different applications of the system 10. Finally, it is understood that an actual number of rings 30 used to join the straps 20a, 20b together may vary based upon a particular insulation structure 60 size and shape.

Referring now to FIGS. 2 and 3, a perspective view of the strap assemblies 20a, 20b and a sectional view of the system 10, according to a preferred embodiment of the invention, are disclosed. The tightening strap assembly 20a includes a tightening strap section 22a made using a length of strong strapping material such as nylon, and being formed at one (1) end into a first loop portion 24a being attached using a sewn region 70. The first loop 24a is affixed to the insulation structure 60 via a piercing pin 40 and a pair of retaining washers 44a, 44b. The free-end portion of the tightening strap section 22a is then routed through the aforementioned ring 30 to form a fourth loop 24d, and back onto itself and the first loop 24a. The tightening strap section 22a is subsequently fastened to a top surface of the first loop 24a by respective sewn-on first closure 80a and second closure 80b portions, envisioned to be made using VELCRO® or an equivalent attachment means. The anchoring strap assembly 20b includes an anchoring strap section 22b made using a straight length, or a continuous loop portion (shown here), of a similar strapping material as the tightening strap section 22a. A second loop portion 24b is formed at one (1) end of the anchoring strap section 22b which passes through the ring 30. An opposing end of the anchoring strap section 22b is formed into a third loop portion 24c. The intermediate double-layer portion of the anchoring strap section 22b, positioned between the second loop 24b and third loop 24c portions, is to be affixed together via a sewn region 70. The third loop 24c is affixed to the insulation structure 60 in a similar manner as the aforementioned first loop 24a, using a piercing pin 40 and a pair of retaining washers 44a, 44b.

The first loop 24a portion of the tightening strap assembly 20a, and the third loop portion 24c of the anchoring strap assembly 20b are anchored to the subjacent insulation structure 60 by a linear rod 40 having a sharp piercing tip portion 43. The rod 40 is capable of piercing through the insulation structure 60 and enabling the length-adjustable strap assemblies 20a, 20b to tighten the insulation structure 60 around the existing piping member 100 for the purpose of thermal insulation.

In use, the insulation structure 60a would be wrapped entirely around a correspondingly shaped existing piping member 100 such as a pipe, a valve, a pressure vessel, and the like. It is envisioned that various standard and custom models of the system 10 would be made available for mounting to correspondingly shaped existing piping members 100. The piping insulation structure 60 is to provide at least one (1) seam 66 to allow the insulation structure 60 to be wrapped tightly around the existing piping members 100.

An embodiment of the tightening strap assembly 20a and the anchoring strap assembly 20b, along with connecting rings 30, is shown in FIG. 2. Each strap assembly 20a, 20b includes a rod 40. The rods 40 provide effective attachment of the first 24a and third 24c loop portions of respective tightening 20a and anchoring 20b strap assemblies to the insulation structure 60. Each rod 40 is envisioned to be made using a malleable metal material, such as steel, being capable of repeated bending and straightening without failure. The rod 40 is envisioned to be approximately three inches (3 in.) in length; however, the rod 40 may be longer or shorter based upon a thickness of the insulation structure 60 used for a particular application. Each rod 40 provides a structure similar to that of a common carpentry nail having integral portions including a rod shank 41, a round or flat rod head 42, and a pointed rod tip 43. A rod head 42 is secured within each first loop 24a and third loop 24c via insertion of a first retaining washer 44a upon the rod shank 41 subjacent to the rod head 42. It is envisioned that the strap assemblies 20a, 20b would be purchased in a pre-assembled form with a rod head 42 and a first retaining washer 44a being positioned within the first 24a and third 24c loops. Once installed, the respective rod shanks 41 would protrude inwardly, piercing through and protruding from a bottom portion of the first 24a and third 24c loops.

During installation upon an insulation structure 60, the rod shank 41 would be forced completely through the outer layer 64, the insulation layer 68, and the inner layer 62 of the insulation structure 60 so as to protrude from the inner layer 62. The rod 40 would then be secured to the insulation structure 60 by inserting a second retaining washer 44b onto a rod tip portion 43 of the rod shank 41 and manually providing a bend 45 in the rod shank 41 of approximately ninety (90°) degrees. The bend 45 would be positioned subjacent to the second retaining washer 44b such that the rod tip 43 contacts the second retaining washer 44b. The retaining washers 44a, 44b are envisioned to be made of a rugged metal or plastic material such as, but not limited to: plated steel, nylon, or the like. The retaining washers 44a, 44b may have various shapes such as round, rectangular, and the like.

It is envisioned that other styles and configurations of the present invention can be easily incorporated into the teachings of the present invention, and only one (1) particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be installed as indicated in FIGS. 1 through 3.

The method of installing and utilizing the system 10 may be achieved by performing the following steps: procuring a model of the system 10 particularly shaped and sized to fit over an anticipated existing piping member 100 such as a pipe, valve, pressure vessel, or the like; installing the tightening strap assemblies 20a and anchoring strap assemblies 20b onto the insulation structure 60 by temporarily wrapping the insulation structure 60 around the existing piping member 100 while positioning and preparing the strap assemblies 20a, 20b; preparing an initial combination of a tightening strap assembly 20a and an anchoring strap assembly 20b by pre-positioning the strap assemblies 20a, 20b at a desired location along, and perpendicular to, the seam portion 66 of the insulation structure 60; pressing upon the rod heads 42, which together with the first retaining washers 44a, are positioned within the first 24a and third 24c loops; pressing the rod heads 42 until the rod shank portions 41 pierce completely through the insulation structure 60; securing the rod 40 to the insulation structure 60 by inserting the second retaining washers 44b onto each rod tip portion 43 of each rod shank 41; providing a bend 45 in each rod shank 41 subjacent to the second retaining washer 44b, of approximately ninety degrees (90°); repeating the previous steps for all remaining tightening strap assembly 20a and an anchoring strap assembly 20b combinations along the seam 66; securing the system 10 upon the existing piping member 100 by wrapping the system 10 around the existing piping member 100; securing each combination of the tightening strap 20a and anchoring strap 20b portions in a sequential manner by routing and pulling a free-end portion of each tightening strap section 22a through the ring(s) 30 and back onto itself until obtaining a desired fit of the system 10 onto the existing piping member 100; fastening the first closure portion 80a of the tightening strap section 22a to the second closure 80b located on top of the first loop 24a; repeating the previous steps for all remaining tightening strap assembly 20a and an anchoring strap assembly 20b combinations; and, benefiting from an adjustable, configurable, and reusable means of insulating existing piping members 100, afforded a user of the present invention 10.

The rod portions 40 of the strap assemblies 20a, 20b are designed in such a manner so as to be straightened and removed from the insulation structure 60, thereby allowing reuse of the strap assemblies 20a, 20b and/or the insulation structure 60 multiple times if desired.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An insulation system, comprising:
   an insulation structure, comprising a first end, a second end opposite said first end, a first side, a second side opposite said first side, an inner layer, an outer layer, and an insulation layer disposed between said inner layer and said outer layer, wherein a seam is defined when said first end abuts said second end when said insulation structure circumscribes an exterior surface of said piping element; and,
   at least one pair of strap assemblies, each capable of securing said first side to said second side and closing said seam and each further comprising:
      a tightening strap assembly, having a first tightening end removably affixed to said first side at said first end via an attachment means, adjacent said seam;
      an anchoring strap assembly, having a first anchoring end removably affixed to said first side at said second end via said attachment means, adjacent said seam; and,
      a ring, conjoining a second tightening end of said tightening strap assembly to a second anchoring end of said anchoring strap assembly;
   wherein said tightening strap assembly further comprises:

a first tightening strap end formed into a first tightening loop affixed to said insulation structure via said attachment means;
a second tightening loop formed about said ring; and,
a second tightening strap end removably attachable to said first tightening loop.

2. The system of claim 1, wherein said inner layer and said outer layer each comprise a heat-resistant polymer sheet material.

3. The system of claim 2, wherein said heat-resistant polymer sheet material is one of the following: such as polyvinyl chloride, HDPE, phenol-formaldehyde resin, or meta-aramid polymer.

4. The system of claim 1, wherein said ring further comprises a generally rectangular shape and having a round cross-sectional shape.

5. The system of claim 1, wherein said anchoring strap assembly further comprises:
a first anchoring strap end formed into a first anchoring loop affixed to said insulation structure via said attachment means; and,
a second anchoring loop formed about said ring.

6. The system of claim 5, wherein said anchoring strap assembly is conjoined to itself between said first anchoring loop and said second anchoring loop.

7. The system of claim 1, wherein said attachment means comprises:
a rod with a piercing tip at a first end and a rod head at an opposing second end;
a first retaining washer;
a second retaining washer;
wherein said rod head is secured through said first retaining washer disposed within a respective one of said first tightening end or said first anchoring end;
wherein said piercing tip is capable of piercing through said insulation structure and passes through said second retaining washer; and,
wherein a bend formed within said piercing tip retains said rod upon said second retaining washer.

8. The system of claim 1, wherein said attachment means comprises:
a rod with a piercing tip at a first end and a rod head at an opposing second end;
a first retaining washer;
a second retaining washer;
wherein said rod head is secured through said first retaining washer disposed within a respective one of said first tightening loop or said first anchoring end;
wherein said piercing tip is capable of piercing through said insulation structure and passes through said second retaining washer; and,
wherein a bend formed within said piercing tip retains said rod upon said second retaining washer.

9. The system of claim 5, wherein said attachment means comprises:
a rod with a piercing tip at a first end and a rod head at an opposing second end;
a first retaining washer;
a second retaining washer;
wherein said rod head is secured through said first retaining washer disposed within a respective one of said first tightening end or said first anchoring loop;
wherein said piercing tip is capable of piercing through said insulation structure and passes through said second retaining washer; and,
wherein a bend formed within said piercing tip retains said rod upon said second retaining washer.

10. An insulation system, comprising:
an insulation structure, comprising a first end, a second end opposite said first end, a first side, a second side opposite said first side, an inner layer, an outer layer, and an insulation layer bonded to and disposed between said inner layer and said outer layer, wherein a seam is defined when said first end abuts said second end when said insulation structure circumscribes an exterior surface of said piping element; and,
at least one pair of strap assemblies, each capable of securing said first side to said second side and closing said seam and each further comprising:
a tightening strap assembly, having a first tightening end removably affixed to said first side at said first end via an attachment means, adjacent said seam;
an anchoring strap assembly, having a first anchoring end removably affixed to said first side at said second end via said attachment means, adjacent said seam; and,
a ring, conjoining a second tightening end of said tightening strap assembly to a second anchoring end of said anchoring strap assembly
wherein said tightening strap assembly further comprises:
a first tightening strap end formed into a first tightening loop affixed to said insulation structure via said attachment means;
a second tightening loop formed about said ring; and,
a second tightening strap end removably attachable to said first tightening loop.

11. The system of claim 10, wherein said inner layer and said outer layer each comprise a heat-resistant polymer sheet material.

12. The system of claim 11, wherein said heat-resistant polymer sheet material is one of the following: such as polyvinyl chloride, HDPE, phenol-formaldehyde resin, or meta-aramid polymer.

13. The system of claim 10, wherein said ring further comprises a generally rectangular shape and having a round cross-sectional shape.

14. The system of claim 10, wherein said anchoring strap assembly further comprises:
a first anchoring strap end formed into a first anchoring loop affixed to said insulation structure via said attachment means; and,
a second anchoring loop formed about said ring.

15. The system of claim 14, wherein said anchoring strap assembly is conjoined to itself between said first anchoring loop and said second anchoring loop.

16. The system of claim 10, wherein said attachment means comprises:
a rod with a piercing tip at a first end and a rod head at an opposing second end;
a first retaining washer;
a second retaining washer;
wherein said rod head is secured through said first retaining washer disposed within a respective one of said first tightening end or said first anchoring end;
wherein said piercing tip is capable of piercing through said insulation structure and passes through said second retaining washer; and,
wherein a bend formed within said piercing tip retains said rod upon said second retaining washer.

17. The system of claim 10, wherein said attachment means comprises:
a rod with a piercing tip at a first end and a rod head at an opposing second end;
a first retaining washer;

a second retaining washer;

wherein said rod head is secured through said first retaining washer disposed within a respective one of said first tightening loop or said first anchoring end;

wherein said piercing tip is capable of piercing through said insulation structure and passes through said second retaining washer; and, wherein a bend formed within said piercing tip retains said rod upon said second retaining washer.

18. The system of claim 14, wherein said attachment means comprises:

a rod with a piercing tip at a first end and a rod head at an opposing second end;

a first retaining washer;

a second retaining washer;

wherein said rod head is secured through said first retaining washer disposed within a respective one of said first tightening end or said first anchoring loop;

wherein said piercing tip is capable of piercing through said insulation structure and passes through said second retaining washer; and, wherein a bend formed within said piercing tip retains said rod upon said second retaining washer.

\* \* \* \* \*